United States Patent [19]

Lewis

[11] Patent Number: 4,989,360
[45] Date of Patent: Feb. 5, 1991

[54] SELECTIVELY ADJUSTABLE AND DETACHABLE APPARATUS FOR CONNECTING ARTIFICIAL AND LIVE BAIT TO A FISHING LINE

[76] Inventor: Roger C. Lewis, Rte. 2, Box 202-A, Ladd Rd., Brimley, Mich. 49715

[21] Appl. No.: 345,961

[22] Filed: May 1, 1989

[51] Int. Cl.$^5$ .................... A01K 83/00; A01K 91/04
[52] U.S. Cl. ................... 43/42.49; 43/44.83; 43/44.85; 43/42.74
[58] Field of Search ............ 43/42.74, 42.49, 44.8, 43/44.95, 44.83, 44.85, 43.1, 43.14, 44.91

[56] References Cited

U.S. PATENT DOCUMENTS

| | | | |
|---|---|---|---|
| 953,125 | 3/1910 | Desmond | 43/44.85 |
| 1,206,689 | 11/1916 | Forster | 43/44.85 |
| 2,202,976 | 6/1940 | Wise | 43/44.85 |
| 2,227,420 | 1/1941 | Augenblick | 43/28 |
| 2,234,588 | 3/1941 | Cope | 43/42.74 |
| 2,808,678 | 10/1957 | Leonardi | 43/44.8 |
| 2,843,967 | 7/1958 | Kruse | 43/44.95 |
| 4,107,866 | 8/1978 | Manno | 43/44.83 |
| 4,117,619 | 10/1978 | Stevenson | 43/43.1 |
| 4,361,977 | 12/1982 | Lawler | 43/44.83 |
| 4,569,148 | 2/1986 | Kemp | 43/43.1 |

FOREIGN PATENT DOCUMENTS

| | | | |
|---|---|---|---|
| 67128 | 11/1943 | Norway | 43/42.74 |
| 1390910 | 4/1975 | United Kingdom | |

Primary Examiner—Kurt Rowan
Attorney, Agent, or Firm—Lon H. Romanski

[57] ABSTRACT

An apparatus for detachable connection to a fishing line is shown as having a guide structure with a first generally coiled guide portion and a second generally coiled guide portion which are respectively carried at opposite ends of a longitudinally extending shank-like body portion; a relatively flexible coiled element is situated about the shank-like body portion and axially contained between the first and second coiled guide portions, the entire apparatus is detachably secured to the fishing line by merely winding the fishing line through the first coiled guide portion then somewhat randomly winding the fishing line against the flexible coiled element and against the shank-like body portion about which the flexible coiled element is situated, and then winding the fishing line through the second coiled guide portion.

18 Claims, 3 Drawing Sheets

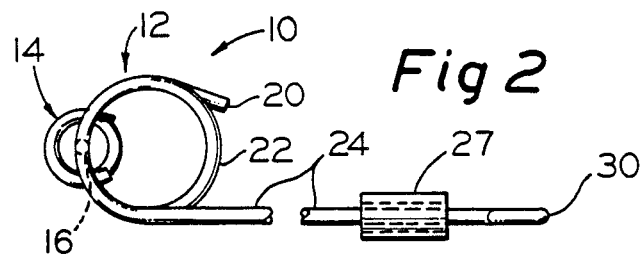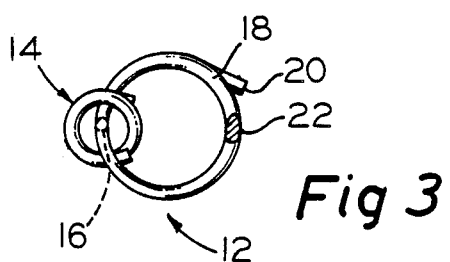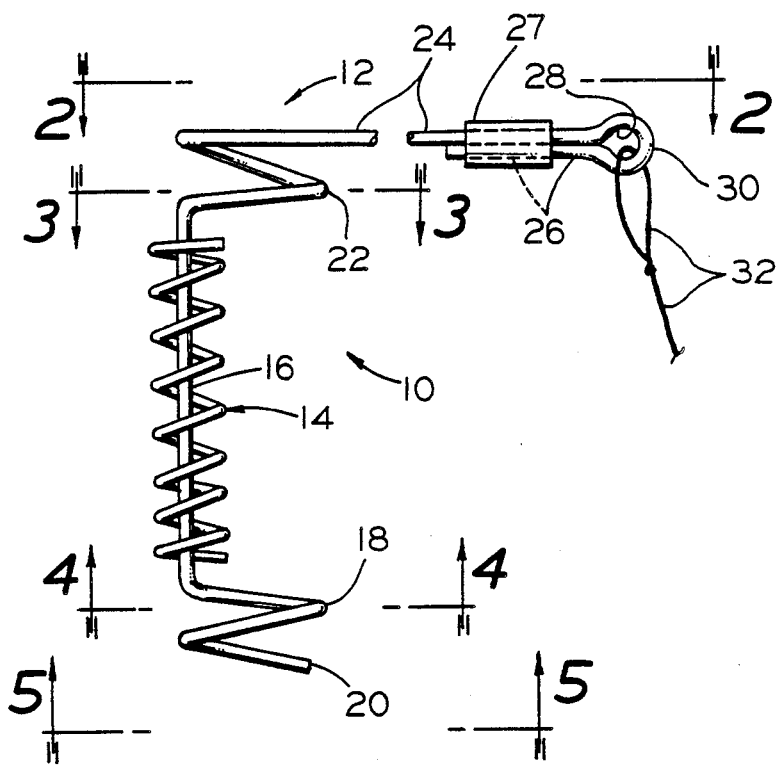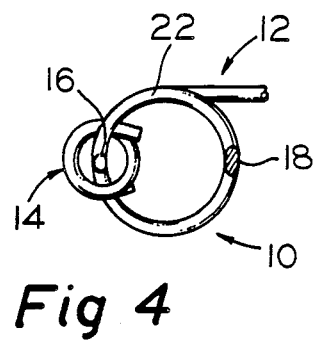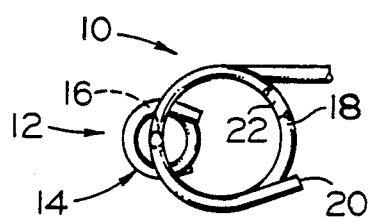

4,989,360

SELECTIVELY ADJUSTABLE AND DETACHABLE APPARATUS FOR CONNECTING ARTIFICIAL AND LIVE BAIT TO A FISHING LINE

FIELD OF THE INVENTION

This invention relates generally to fishing tackle and more particularly to apparatus which can be detachably secured to and elevationally adjusted with respect to associated fishing line, without the need of either cutting or tying knots in such line, for, in turn, operatively connecting artificial or live bait to such fishing line.

BACKGROUND OF THE INVENTION

Heretofore it has been well established that bodies of water, such as lakes and the like, have temperature stratification generally related to the depth of the body of water. It has also been established that the various species of fish have their own preferred temperature stratum. One of the problems in successful fishing is that the depths of such temperature strata do not remain constant and often vary throughout a single day and, further, often vary in relation to differing locations within the overall boundary of the body of water. Consequently, even if a particular person was experiencing success, it often occurs that because of changes in the depth of the particular temperature stratum in which the person was fishing, the person must (often by trial and error) change the depth at which the fishing bait is presented. Those of ordinary skill in the art or sport of fishing will know other factors or problems arising during fishing which also require a change in the depth at which the fishing bait is presented.

In any of such situations, it is a distinct advantage, to the person fishing, if such changes in depth can be easily and quickly made since, as previously stated, the finding of the productive depth is often the result of trial and error and the quicker the changes in depth can be made, the quicker will the desired productive depth be found.

Heretofore, the prior art has proposed various devices by which a fishing hook or the like could be detachably and adjustably connected to an associated fishing line. Some of these have been easier than others to so connect to the fishing line. However, such prior art devices have required considerable care and dexterity in making such a connection and have enjoyed limited, if any, commercial success. Further, such prior art devices require a degree of dexterity which, in the main, result in young children, handicapped people, arthritic people and people with limited eyesight not being able to use them.

The invention as herein disclosed and described is primarily directed to the solution of the aforestated problems as well as other related and attendant problems of the prior art.

SUMMARY OF THE INVENTION

According to the invention an apparatus for detachable connection to an associated fishing line comprises guide structure means, said guide structure means comprising a first generally coiled guide portion, a second generally coiled guide portion, a longitudinally extending shank-like body portion, wherein said first coiled guide portion is carried by said shank-like body portion at a first end thereof, wherein said second coiled guide portion is carried by said shank-like body portion at a second end thereof opposite to said first end, and a relatively flexible coiled element situated about said shank-like body portion and axially contained between said first and second coiled guide portions, and wherein said apparatus is detachably securable to said associated fishing line by winding said fishing line through said first coiled guide portion winding said fishing line against said relatively flexible coiled element and against said shank-like body portion about which said coiled element is situated and winding said fishing line through said second guide portion.

Various general and specific objects, advantages and aspects of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may be omitted from one or more views:

FIG. 1 is a side elevational view of apparatus employing teachings of the invention;

FIG. 2 is a view taken generally on the plane of line 2—2 of FIG. 1 and looking in the direction of the arrows;

FIG. 3 is a cross-sectional view taken generally on the plane of line 3—3 of FIG. 1 and looking in the direction of the arrows;

FIG. 4 is a cross-sectional view taken generally on the plane of line 4—4 of FIG. 1 and looking in the direction of the arrows;

FIG. 5 is a view taken generally on the plane of line 5—5 of FIG. 1 and looking in the direction of the arrows;

DETAILED DESCRIPTION OF THE PREFERRED EMBODIMENT OF THE INVENTION

Figure 7:
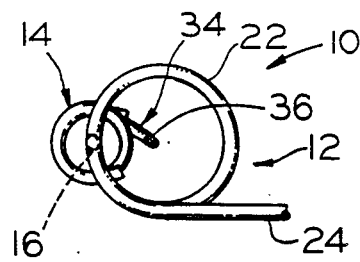
FIG. 7 is a view taken generally on the plane of line 7—7 of FIG. 6 and looking in the direction of the arrows.

Referring now in greater detail to the drawings, FIG. 1 illustrates apparatus 10, for detachable connection to associated fishing line or the like, as comprising a main body or guide 12 and a cooperating axially extending coil-like or spring means 14.

More particularly, the main body or guide 12, which is preferably formed of wire, is depicted as comprising an axially extending generally straight main body portion 16 about which the coiled axially extending means 14 is situated. The lower end (as viewed in FIG. 1) of body portion 16 is preferably integrally formed with a lower coiled guide portion 18 which, preferably, is of a generally helical configuration and terminating as at an end 20. Somewhat similarly, the upper end (as viewed in FIG. 1) of body portion 16 is also preferably integrally formed with a coiled guide portion 22, which is also of a generally helical configuration. As depicted in FIGS. 1–5, in the preferred embodiment the respective directions of helical progression of the upper coil or guide portion 22 and of the lower coil or guide portion 18 are opposite to each other.

As best seen in FIGS. 1 and 2, the upper coil or guide portion 22 is preferably integrally formed with a generally laterally extending cantilever-like arm portion 24 which may have a bent-back segment 26. The segment 26 may be held in, what may be considered, a closed position or condition, as depicted, as by suitable closure or retainer means 27. In the embodiment illustrated, the retainer means 27 takes the form of a tubular member which is slidable about both arm portion 24 and segment 26 and, when in the position depicted, serves to hold the segment 26 in its closed condition against the tendency of segment 26 to resiliently spring open and away from arm portion 24. With the segment 26 in its depicted closed position, an eye-like opening 28 is defined within the formed end 30 which serves as a juncture between segment 26 and arm portion 24. The opening or passage 28, in turn, serves as a means for securing associated selected fishing items as, for example, an associated fishing line or fish-line leader depicted at 32 and intended to, generically, represent the various forms of fishing items which may be operatively connected to arm portion 24 by passage through opening 28.

In the embodiment illustrated, the line or leader means 32 (shown provided with an already formed loop portion) may be operatively connected to arm portion 24 merely by first axially sliding retainer or locking means 27 to the left (as viewed in FIG. 1) until it is clear of the end of segment 26. At that time segment 26 can be moved, or will resiliently move, generally downwardly (as viewed in FIG. 1) away from arm portion 24 thereby defining a space (between segment 26 and arm portion 24) leading to the eye-like opening or aperture 28. The looped portion of the line means 32 can then be placed generally about segment 26 and moved through said space and into eye-like opening 28. Thereafter, segment 26 is moved back toward arm portion 24 and retainer or locking means 27 slid axially to the right (as viewed in FIG. 1) to thereby capture segment 26 and hold it in its depicted closed position.

As seen in FIGS. 1–5, even though the guide means 12 has its opposite guide portion 18 and 22 coiled and effectively open, nevertheless when viewed generally axially as in any of FIGS. 2–5 such guide portions 18 and 22 appear as having a closed ring-like configuration. This, as will be better seen in FIG. 6, prevents the related fishing line from escaping the confines of guide portions 18 and 22 as by relative sideways movement of the related fishing line and the guide means 12.

Figure 6:
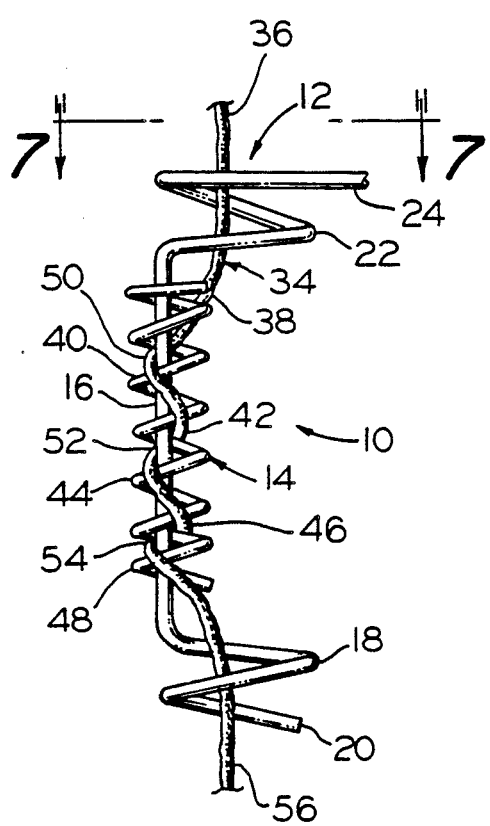
FIG. 6 is a side elevational view of the apparatus of FIG. 1 operatively connected to associated fishing line.

FIGS. 6 and 7 illustrate the apparatus 10, of FIG. 1, operatively secured to associated fishing line 34. More particularly, in order to secure the apparatus 10 to the fishing line 34, all that has to be done is to wind the line 34 through the upper spiral or helical guide portion 22 resulting in the upper portion 36 of line 34 being generally radially contained within the upper guide portion 22 as depicted in FIGS. 6 and 7. Next, the line 34 is wound (for example, four or five times) generally about and between the coils or spirals of retainer or locking member 14 as best seen in FIG. 6 thereby causing certain portions of the line 34, as at 38, 40, 42, 44, 46 and 48, to engage against the outer surface of the juxtaposed coil portions of member 14 and simultaneously causing certain other portions of the line 34, as at 50, 52 and 54, to engage against the shank or body portion 16. Finally, the line 34 is then wound through the lower spiral or helical guide portion 18 resulting in a lower portion 56 of line 34 being generally radially contained within lower guide portion 18 as depicted in FIG. 6. A slight oppositely directed pulling on line portions 36 and 56 further assures that the line 34 is operatively engaged with shank or body 16. In any event, when the apparatus 10 is thusly connected to line 34 its position along line 34 is established and subsequent rotation of the apparatus 10, as about the line 34, does not result in a disengagement therebetween.

If it should be desired to change the depth of the apparatus 10, that is, change its position generally longitudinally of line 34, all that needs to be done is to simply unwind a portion of line 34 (reverse from what had been to previously secure the apparatus 10 to line 34) from the apparatus 10, and then slide the apparatus 10 along line 34 to the new desired location and thereafter rewind the unwound portion of line 34 about the apparatus 10, as previously described, to again secure the apparatus 10 in its newly selected location or position.

Figure 8:
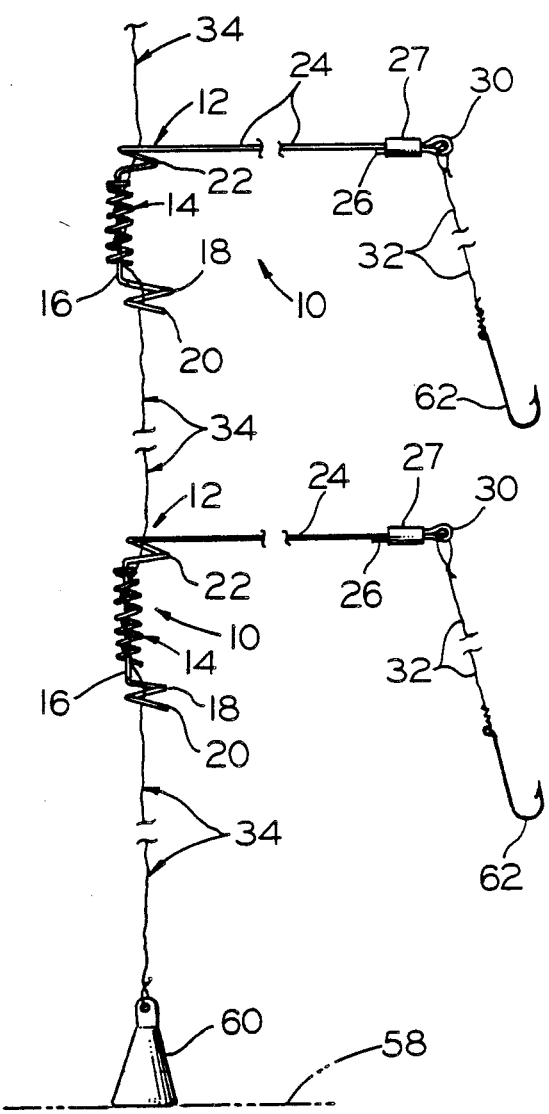
FIG. 8 is a view of a single fishing line, or the like, having connected thereto a plurality of the structures of FIG. 1 detachably secured to such fishing line in the manner of FIG. 6.

FIG. 8 illustrates an arrangement wherein a plurality of apparatus 10 are connected to a single line 34, in a manner as described with reference to FIGS. 6 and 7, with such being situated along the line 34 at varying depths relative to, for example, a lake bottom 58. Although the invention is not so limited, the apparatus 10 of FIG. 8 are shown connected to a line 34 which is secured to a weighted member (sinker) 60 resting upon the lake bottom 58.

As depicted in FIG. 8, a fishing hook 62 is shown secured to arm 24 of apparatus 10 as by means of a segment of fishing line or leader means 32. As should now be apparent, the size of the hooks 62 respectively connected to the upper and lower apparatus 10 could be of differing sizes if, for example, the respective relative elevations (or water depths) were such as to favor larger or smaller fish at such respective elevations.

The hooks 62, as shown in FIG. 8, are intended to constitute a generic disclosure of various types and kinds of fish-catching means. That is, as previously stated, lures, artificial and live bait may be used in combination with, and operatively secured to, the apparatus 10. Any or all of such would be operatively connected to the arm 24 as generally indicated by hook 62 and its leader line 32. Accordingly, the term, hook, as employed herein is used in such a broad and generic scope.

As was previously discussed with reference to FIGS. 6 and 7, so, too, the relatively upper apparatus 10 and the relatively lower apparatus 10 of FIG. 8 may be selectively adjusted, independently of each other, to newly selected positions along line 34.

Figure 9:
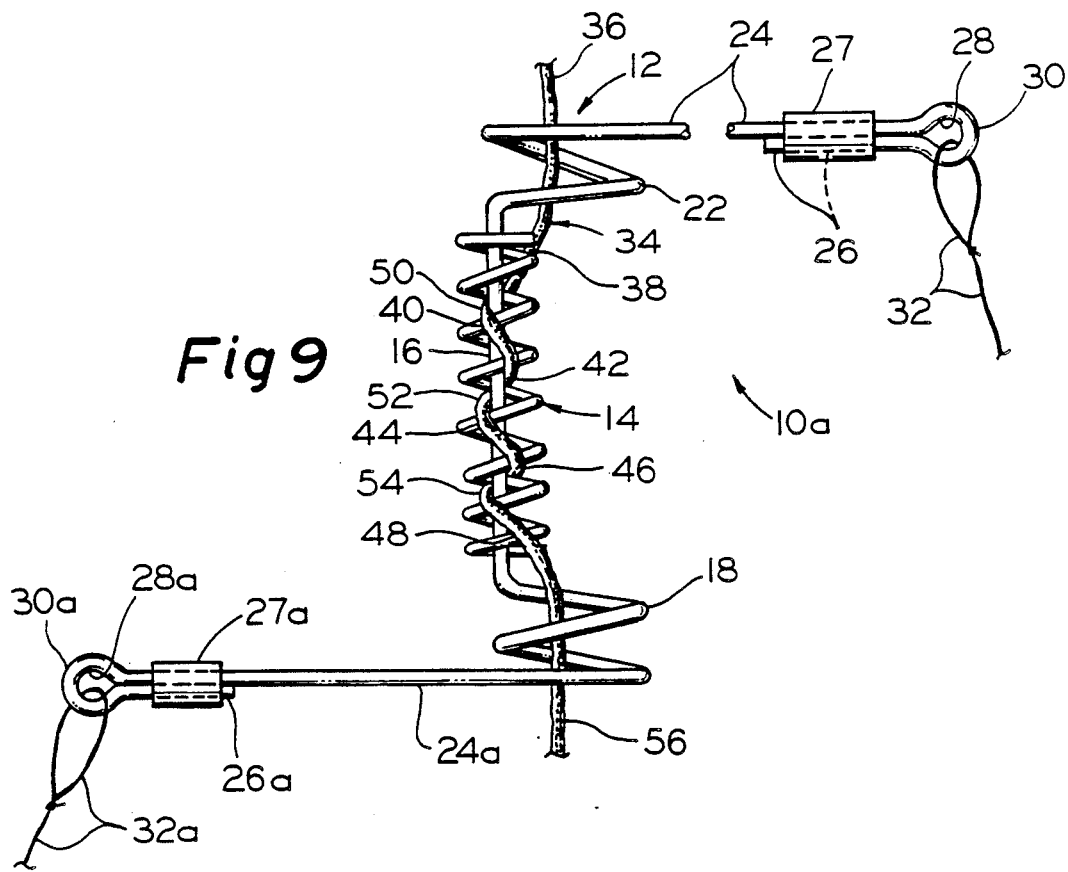
FIG. 9 is a view similar to that of FIGS. 1 or 6 but illustrating another embodiment of the invention.

Embodiment of FIG. 9

The apparatus 10a as disclosed in FIG. 9 is a modification of the apparatus 10 of FIGS. 1–7; all elements in FIG. 9 which are like or similar to those of FIGS. 1–7 are, except as specifically noted to the contrary, identified with like reference numbers.

In comparing the embodiments of FIG. 9 and of FIGS. 1–7, it can be seen that whereas the apparatus 10 of FIGS. 1–7 is provided with a single generally transverse arm 24, the apparatus 10a of FIG. 9 is provided with a second generally transverse cantilever-like arm 24a which, preferably, is integrally formed with lower guide or coil portion 18. Although the invention is not so limited, in the preferred embodiment of the apparatus 10a of FIG. 9 the second arm portion 24a is formed as to be extending in a direction generally opposite to the direction of extension of arm portion 24.

The elements 26a, 27a, 28a, 30a and 32a comprising a portion of or associated with second arm 24a respectively correspond to and function in the same manner as elements 26, 27, 28, 30 and 32 of arm 24 as previously described with reference to FIGS. 1-8. Just as a single line 34 was depicted in FIG. 8 as operatively carrying a plurality of apparatus 10, so, too, a plurality of apparatus 10a may be operatively connected to a single line 34.

The same method of winding the line 34, onto and about the guide member shank or body 16 and the coiled member 14, for detachably securing the apparatus 10a to line 34, as well as slidably moving the apparatus 10a along line 34 to a newly selected position therealong, is employed as previously described with reference to FIG. 6. Of course, hooks 62 may be operatively connected to both arms 24 and 24a by any suitable means as, for example, 32 and 32a.

Figure 10:
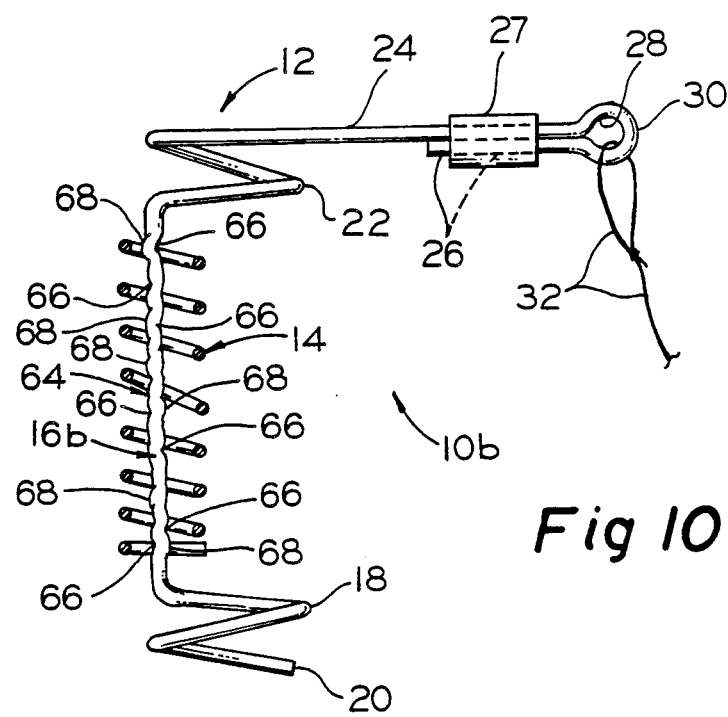
FIG. 10 is a view similar to that of FIG. 1 but illustrating still another embodiment of the invention.

Embodiment of FIG. 10

The apparatus 10b as disclosed in FIG. 10 is a modification of the apparatus 10 of FIGS. 1-7; however, the modification disclosed and contemplated by appartus 10b can also apply to and be a modification of apparatus 10a of FIG. 9. In FIG. 10, generally, those elements of apparatus 10b which are like or similar to the elements of FIGS. 1-7 are identified with like reference numbers. For purposes of greater clarity, the coiled or spiral member 14 is shown in axially extending cross-section.

In comparing the embodiments of FIG. 10 and of FIGS. 1-7, it can be seen that the modification resides in the shank or body 16b of apparatus 10b. More particularly, referring for example to FIG. 1, it can be seen that in the embodiment of apparatus 10, the shank or body 16 is of a generally uniform and consistent configuration for its functional length. (In the preferred embodiment of apparatus 10, such body portion 16 would be a generally straight length of cylindrical wire.) In comparison, in apparatus 10b the shank or body portion 16b is provided with what may be termed an uneven outer surface 64 along its functional length. Such an outer surface 64 may be formed in any of a number of ways; for example, the shank or body portion 16b may be struck as to form a plurality of indentations 66 therein and such may be formed: (1) either uniformly or randomly spaced from each other; (2) in general axial or longitudinal alignment along the body portion 16b; or (3) uniformly or randomly situated circumferentially about and/or longitudinally of body portion 16b. Such outer surface 64 may also be formed by a plurality of generally raised surface portions 68 which may be formed in locations and relationships as hereinbefore described with reference to indentations 66. Of course, as depicted in FIG. 10, the shank or body portion 16b may be provided with both indentations 66 and raised or enlarged surface portions 68.

The same method of winding the line 34, onto and about the guide member shank or body 16b and the coiled member 14, for detachably securing the apparatus 10b to line 34, as well as slidably moving the apparatus 10b along line 34 to a newly selected position therealong, is employed as previously described with reference to FIG. 6. The provision of a generally uneven outer surface 64 carried by shank or body portion 16b results in an enhanced gripping action as between such body portion 16b and the associated line 34 and consequently further assures the non-movement of the apparatus 10b, relative to wound line 34, even when fish of rather significantly greater weight and/or of greater instincts for fighting to release themselves from the hook are caught.

Also, the generally contoured, textured or gripping surface 64 carried by shank or body portion 16b may be formed as by a suitable coating applied to the body portion 16 (FIGS. 1-8), or, as by, for example, a tubular member, of somewhat elastomeric material, carried by and about body portion 16 and within member 14.

The invention has been disclosed with an arm 24 (or arms 24 and 24a) terminating in an openable end portion. However, the practice of the invention is not so limited and the arm 24 (and/or arm 24a) may terminate in any desired configuration. Further, the closure means 27 has been disclosed as being a tubular member; however, in embodiments employing closure means many different forms thereof are possible. For example, a coiled spring-like member could be employed or the segment 26 could be provided with an end hook-like portion which would engage with arm 24 much as a clasp.

Further, member 14 has been referred to as a coiled spring; however, as should now be apparent member 14 may be any suitable relatively flexible spiral element comprised of, for example, either spring wire or any suitable plastic material.

In addition to the benefits already referred to as being provided by the invention, the detachable and adjustable guide apparatus of the invention has many different uses and, as will be known to those skilled in the art or sport of fishing and the tackle employed in such sport, the invention is adaptable to most fishing conditions and is employable in many differing overall applications of tackle means. For example, the invention provides ideal structure for the replacement of three-way swivels which swivels require many different knots to be attached thereto to complete the fishing rig while the use of the invention requires no cutting of the fishing line and no knots while at the same time enabling the quick and easy adjustment thereof along the fishing line to newly selected locations therealong.

Even though only a preferred embodiment and selected modifications of the invention have been disclosed and described, it is apparent that other embodiments and modifications of the invention are possible within the scope of the appended claims.

What is claimed is:

1. Apparatus for detachable connection to an associated fishing line, comprising guide structure means, said guide structure means comprising a first generally coiled guide portion, a second generally coiled guide portion, a longitudinally extending shank-like body, wherein said first coiled guide portion is carried by said shank-like body at a first end thereof, wherein said second coiled guide portion is carried by said shank-like body at a second end thereof opposite to said first end, wherein said shank-like body is continuous and generally straight throughout its longitudinal length from said first end to said second end, and a relatively flexible coiled element axially mounted around said shank-like body and axially contained between said first and second coiled guide portions, the axis of said flexible coiled element is substantially parallel to the axes of said guide portions, and wherein said apparatus is detachably securable to said associated fishing line by winding said fishing line through said first coiled guide portion winding said fishing line against said relatively flexible coiled element and against said shank-like body about which said coiled element is situated and winding said fishing line through said second guide portion.

2. Apparatus according to claim 1 and further comprising means carried by said guide structure means for the operative connection thereto of an associated fishing hook.

3. Apparatus according to claim 2 wherein said means carried by said guide structure means for the operative connection thereto of an associated fishing hook comprises arm means carried at one end thereof by said first coiled guide portion and extending therefrom in a direction generally transverse to said longitudinally extending shank-like body as to assume a cantilevered configuration, wherein said arm means comprises an other end opposite to said one end, and wherein said other end is a free end of said cantilevered configuration connected only to said first coiled guide portion through said arm means.

4. Apparatus according to claim 3 wherein said arm means defines an opening for the operative connection therethrough of said associated fishing hook.

5. Apparatus according to claim 1 and further comprising first and second means carried by said guide structure means for the operative connection thereto of first and second fishing hooks respectively.

6. Apparatus according to claim 5 wherein said first means carried by said guide structure means for the operative connection thereto of said first fishing hook comprises first arm means carried by said first coiled guide portion and extending therefrom in a direction generally transverse to said longitudinally extending shank-like body, and wherein said second means carried by said guide structure means for operative connection thereto of said second fishing hook comprises second arm means carried by said second coiled guide portion and extending therefrom in a direction generally transverse to said longitudinally extending shank-like body, and wherein said first arm means and said second arm means are connected to each other only through said first and second coiled guide portions and said longitudinally extending shank-like body.

7. Apparatus according to claim 1 wherein said first coiled guide portion comprises a helical coil which when viewed in a direction generally parallel to the longitudinal axis of said longitudinally extending shank-like body appears as a closed ring-like configuration.

8. Apparatus according to claim 1 wherein said longitudinally extending shank-like body carries a textured outer surface, wherein said textured outer surface comprises a plurality of surface indentations in said shank-like body situated generally along said shank-like body and between said first and second ends.

9. Apparatus according to claim 8 wherein said textured outer surface further comprises a plurality of surface portions carried by said shank-like body between said first and second ends and projecting in directions generally transverse to the longitudinally extending shank-like body.

10. Apparatus according to claim 1 wherein said longitudinally extending shank-like body carries a textured outer surface, and wherein said textured outer surface comprises a coating carried by said shank-like body between said first and second ends.

11. Apparatus for detachable connection to an associated fishing line, comprising guide structure means, said guide structure means comprising a first generally coiled guide portion, a second generally coiled guide portion, a longitudinally extending shank-like body portion, wherein said first coiled guide portion is carried by said shank-like body portion at a first end thereof, wherein said second coiled guide portion is carried by said shank-like body portion at a second end thereof opposite to said first end, and a relatively flexible coiled element situated about said shank-like body portion and axially contained between said first and second coiled guide portions, and wherein said apparatus is detachably securable to said associated fishing line by winding said fishing line through said first coiled guide portion winding said fishing line against said relatively flexible coiled element and against said shank-like body portion about which said coiled element is situated and winding said fishing line through said second guide portion, further comprising means carried by said guide structure means for the operative connection thereto of an associated fishing hook wherein said means carried by said guide structure means for the operative connection thereto of an associated fishing hook comprises arm means carried by said first coiled guide portion and extending therefrom in a direction generally transverse to said longitudinally extending shank-like body portion, wherein said arm means defines an opening for the operative connection therethrough of said associated fishing hook, wherein said opening is defined by a bent-back portion of said arm means, and further comprising disengageable closure means for selectively holding said bent-back portion in a closed position generally juxtaposed to an associated portion of said arm means.

12. Apparatus according to claim 11 wherein said closure means comprises a generally tubular member axially slidable along said arm means and said bent-back portion of said arm means, said tubular member being effective to be simultaneously slid along both said arm means and said bent-back portion to thereby internally contain said bent-back portion and preclude undesired movement of said bent-back portion away from said associated portion of said arm means when in said closed position.

13. Apparatus for detachable connection to an associated fishing line, comprising guide structure means, said guide structure means comprising a first generally coiled guide portion, a second generally coiled guide portion, a longitudinally extending shank-like body portion, wherein said first coiled guide portion is carried by said shank-like body portion at a first end thereof, wherein said second coiled guide portion is carried by said shank-like body portion at a second end thereof opposite to said first end, and a relatively flexible coiled element situated about said shank-like body portion and axially contained between said first and second coiled guide portions, and wherein said apparatus is detachably securable to said associated fishing line by winding said fishing line through said first coiled guide portion winding said fishing line against said relatively flexible coiled element and against said shank-like body portion about which said coiled element is situated and winding said fishing line through said second guide portion, and further comprising first and second means carried by said guide structure means for the operative connection thereto of first and second fishing hooks respectively, wherein said first means carried by said guide structure means for the operative connection thereto of said first fishing hook comprises first arm means carried by said first coiled guide portion and extending therefrom in a direction generally transverse to said longitudinally extending shank-like body portion, wherein said second means carried by said guide structure means for operative connection thereto of said second fishing hook comprises second arm means carried by said second coiled guide portion and extending therefrom in a direction generally transverse to said longitudinally extending shank-like body portion, and wherein the directions of extension of said first and second arm means are generally opposite to each other.

14. Apparatus for detachable connection to an associated fishing line, comprising guide structure means, said guide structure means comprising a first generally coiled guide portion, a second generally coiled guide portion, a longitudinally extending shank-like body portion, wherein said first coiled guide portion is carried by said shank-like body portion at a first end thereof, wherein said second coiled guide portion is carried by said shank-like body portion at a second end thereof opposite to said first end, and a relatively flexible coiled element situated about said shank-like body portion and axially contained between said first and second coiled guide portions, and wherein said apparatus is detachably securable to said associated fishing line by winding said fishing line through said first coiled guide portion winding said fishing line against said relatively flexible coiled element and against said shank-like body portion about which said coiled element is situated and winding said fishing line through said second guide portion, and further comprising first and second means carried by said guide structure means for the operative connection thereto of first and second fishing hooks respectively, wherein said first means carried by said guide structure means for the operative connection thereto of said first fishing hook comprises first arm means carried by said first coiled guide portion and extending therefrom in a direction generally transverse to said longitudinally extending shank-like body portion, wherein said second means carried by said guide structure means for operative connection thereto of said second fishing hook comprises second arm means carried by said second coiled guide portion and extending therefrom in a direction generally transverse to said longitudinally extending shank-like body portion, wherein said first arm means defines a first opening for the operative connection therethrough of said first fishing hook and wherein said second arm means defines a second opening for the operative connection therethrough of said second fishing hook.

15. Apparatus according to claim 14 wherein said first opening is defined by a first bent-back portion of said first arm means, and further comprising first disengageable closure means for selectively holding said first bent-back portion in a closed position generally juxtaposed to an associated portion of said first arm means, wherein said second opening is defined by a second bent-back portion of said second arm means, and further comprising second disengageable closure means for selectively holding said second bent-back portion in a closed position generally juxtaposed to an associated portion of said second arm means.

16. Apparatus for detachable connection to an associated fishing line, comprising guide structure means, said guide structure means comprising a first generally coiled guide portion, a second generally coiled guide portion, a longitudinally extending shank-like body, wherein said first coiled guide portion is carried by said shank-like body at a first end thereof, wherein said second coiled guide portion is carried by said shank-like body at a second end thereof opposite to said first end, and a relatively flexible coiled element, said coiled element comprising an axially extending coiled spring means having a plurality of coils, wherein said plurality of coils define a generally centrally situated axially extending passage the transverse size and configuration of which is substantially larger than the transverse size and configuration of said longitudinally extending shank-like body, wherein said axially extending coiled spring means is situated about said longitudinally extending shank-like body in a manner whereby said shank-like body passes through said axially extending passage thereby resulting in said plurality of coils circumferentially encompassing said shank-like body, wherein said coiled spring means is transversely movable with respect to said shank-like body to the extent permitted by the difference in said transverse size and configuration between said axially extending passage and said longitudinally extending shank-like body, wherein said axially extending coiled spring means is axially contained between said first and second coiled guide portions, and wherein said apparatus is detachably securable to said associated fishing line by winding said fishing line through said first coiled guide portion winding said fishing line against said axially extending coiled spring means and against said shank-like body about which said axially extending coiled spring means is situated and winding said fishing line through said second guide portion.

17. Apparatus for detachable connection to an associated fishing line, comprising guide structure means, said guide structure means comprising a first generally coiled guide portion, a second generally coiled guide portion, a longitudinally extending shank-like body, wherein said first coiled guide portion is carried by said shank-like body at a first end thereof, wherein said second coiled guide portion is carried by said shank-like body at a second end thereof opposite to said first end, wherein said shank-like body is continuous and generally straight throughout its longitudinal length from said first end to said second end, and an axially extending coiled spring member having first and second spring ends and having an axially extending passage defined by the coils of said coiled spring member, wherein said axially extending coiled spring member is situated about said shank-like body as to have said shank-like body generally loosely contained within said axially extending passage, wherein said axially extending coiled spring member has an axial length at least equal to a major portion of the longitudinal length of said shank-like body, and wherein said apparatus is detachably securable to said associated fishing line by winding said fishing line through said first coiled guide portion winding said fishing line against said axially extending coiled spring member and against said shank-like body about which said axially extending coiled spring member is situated and winding said fishing line through said second guide portion.

18. Apparatus for detachable connection to an associated fishing line, comprising guide structure means, said guide structure means comprising a first generally coiled guide portion, a second generally coiled guide portion, a longitudinally extending shank-like body, wherein said first coiled guide portion is carried by said shank-like body at a first end thereof, wherein said second coiled guide portion is carried by said shank-like body at a second end thereof opposite to said first end, and an axially extending coiled spring member having first and second spring ends, said axially extending coiled spring member being axially mounted around; said shank-like body and axially contained between said first and second coiled guide portions as to have said first spring end juxtaposed to said first coiled guide portion and as to have said second spring end juxtaposed to said second coiled guide portion, the axis of said coiled spring member is substantially parallel to the axes of said guide portions, and wherein said apparatus is detachably securable to said associated fishing line by winding said fishing line through said first coiled guide portion winding said fishing line against said axially extending coiled spring member and against said shank-like body about which said axially extending coiled spring member is situated and winding said fishing line through said second guide portion.

* * * * *

UNITED STATES PATENT AND TRADEMARK OFFICE
CERTIFICATE OF CORRECTION

PATENT NO. : 4,989,360

DATED : February 5, 1991

INVENTOR(S) : Roger C. Lewis

It is certified that error appears in the above-identified patent and that said Letters Patent is hereby corrected as shown below:

Column 8, line 18 (Claim 11, line 22 thereof), between "hook" and "wherein" insert a comma.

Column 9, line 45 (Claim 14, line 37 thereof), between "hook" and "and" insert a comma.

Signed and Sealed this

Seventeenth Day of March, 1992

Attest:

HARRY F. MANBECK, JR.

*Attesting Officer*     *Commissioner of Patents and Trademarks*